Patented Dec. 29, 1936

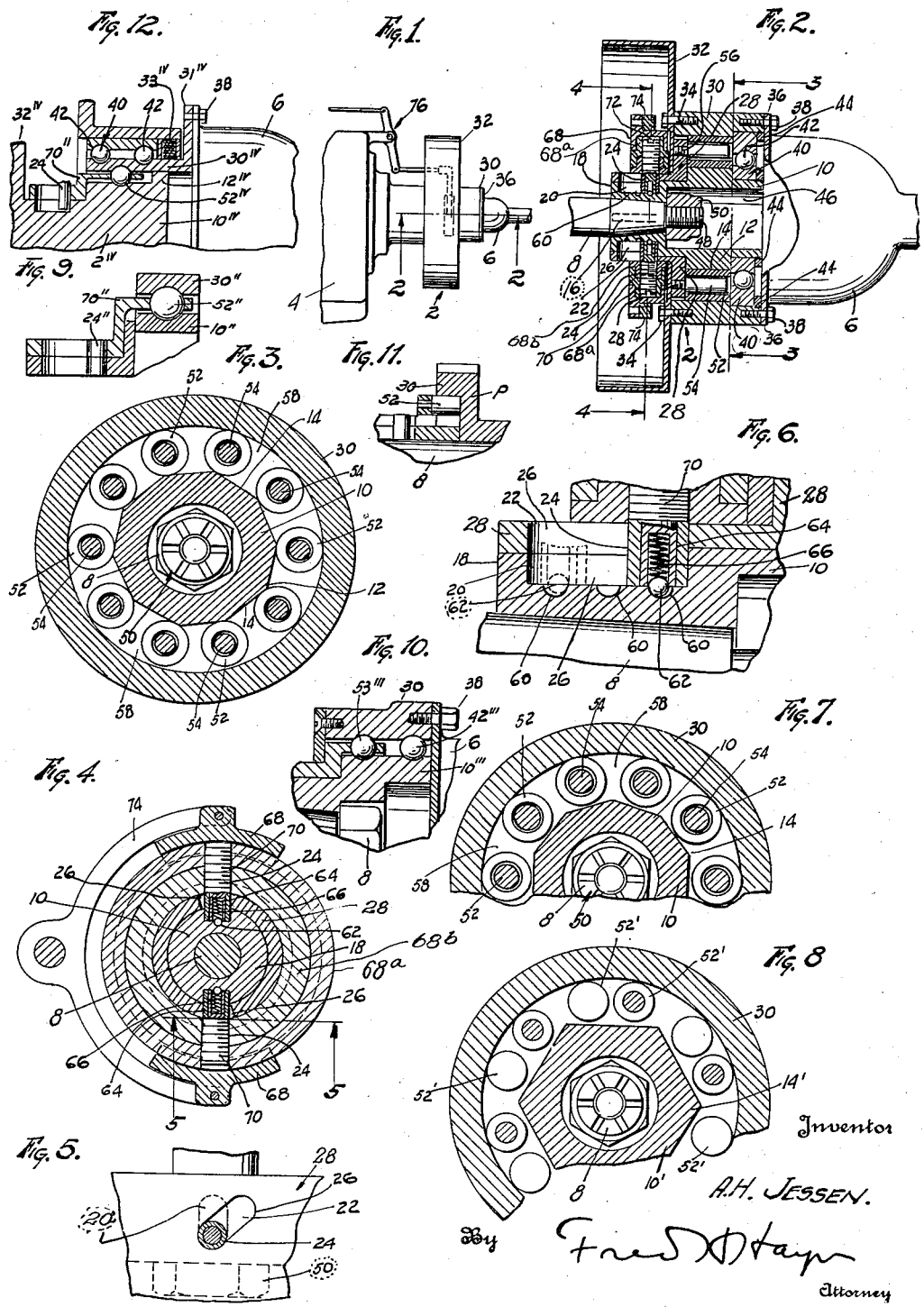
Dec. 29, 1936. A. H. JESSEN 2,065,938
MULTIPLE ACTING OVERRUNNING CLUTCH
Filed April 27, 1931

2,065,938

UNITED STATES PATENT OFFICE 2,065,938

MULTIPLE-ACTING OVERRUNNING CLUTCH

Arnold H. Jessen, Los Angeles, Calif.

Application April 27, 1931, Serial No. 533,082

8 Claims. (Cl. 192—44)

One important object of my invention is to provide a novel form of clutch mechanism, preferably of the multiple-acting overrunning type, in which a suitable cam member, preferably provided with any desired number of angular cam portions, is adapted to be actuated by a drive member, which cam member is adapted by suitable means to drive a driven member, which may be either an overrunning member, separate and distinct from the transmission mechanism with which said clutch mechanism is adapted to be associated, or may form a part of such transmission mechanism, and preferably associated with one of the drive pinions thereof, forming the overrunning member, or may entirely replace the transmission mechanism, suitable cam devices, such as rollers, balls, or the like, being positioned between said overrunning member and said cam member, which cam devices are adapted to be actuated by a suitable control means, operated in any preferred way, and adapted simultaneously to engage either certain of said devices or all of them.

It is also within the province of my invention to provide a novel form of cam device actuating means, comprising a cam sleeve with which is associated at least one shiftable device, preferably consisting of a spring actuated element, such as a ball, adapted to engage selectively a set of depressions in said sleeve, said element in turn being adapted to oscillate through any desired arc a set of cam devices of any preferred number to engage with or disengage from said cam sleeve, or operate idly with respect thereto.

It is also an object of my invention to provide a novel form of combined clutch and bearing means, preferably, comprising a cam sleeve, provided with at least two sets of depressions of any preferred number, in which depressions are positioned balls of the same or different sizes whereby a driven member, having complementary sets of depressions, may be driven in one or two directions or run freely with respect to said cam sleeve, either in one or two directions.

Further objects and advantages of my invention, as will hereinafter more fully appear, I attain by the construction described in the specification, and illustrated in its preferred form on the drawing, forming a part of my application.

Reference is had to the accompanying drawing, in which similar reference characters denote similar parts. In the drawing, Fig. 1 is a more or less diagrammatic fragmentary side elevational view illustrating how my invention may be applied to the driven shaft of a transmission mechanism and the universal joint of said shaft, Fig. 2 is an enlarged longitudinal section, taken on the line 2—2, Fig. 1, Fig. 3 is a still further enlarged cross-sectional view, taken on the line 3—3, Fig. 2, looking in the direction of the arrows, Fig. 4 is a similar view, taken on the line 4—4, Fig. 2, Fig. 5 is an enlarged, fragmentary detail sectional view, taken on the line 5—5, Fig. 4, Fig. 6 is also a sectional view taken on the line 2—2, Fig. 1, but of fragmentary form and on an enlarged scale with respect to Fig. 2, illustrating the cam device operating means, Fig. 7 is a fragmentary cross-sectional view, similar to Fig. 3, but showing the cam devices in neutral position, Fig. 8 is a view similar to Fig. 7, but showing a modified form of my invention, illustrating a cam device double lock for locking in two directions, and free running or wheeling in one direction, alternate cam devices being simultaneously operated or controlled, Fig. 9 is an enlarged fragmentary sectional detail view of a modified form of cam device control or actuating means, Fig. 10 is a fragmentary detail sectional view of a modfied transmission mechanism with my means, Fig. 11 is a similar view illustrating how the invention may be applied to the transmission mechanism, and Fig. 12 is a fragmentary cross-sectional view of a modified transmission mechanism with my invention applied thereto, all gearing and gear shift means being dispensed with.

Describing my invention more in detail, in its broader aspects said invention comprises a novel form of multiple acting overrunning clutch in which a set of driving parts associated with said clutch is adapted to drive a set of driven parts also associated with said clutch, which parts may be placed outside of a conventional form of transmission mechanism, the driven parts being associated in any preferred way with the universal joint of the drive shaft, or said transmission mechanism may be modified so my invention may be directly applied thereto, or entirely replaced, means being associated with said driving and driven parts whereby free running or free wheeling may be provided for in a plurality of ways, as may also the power drive, said means being under direct control of the operator.

More specifically my invention comprises a structure designated generally by the reference numeral 2, and, if desired, as shown in Fig. 1, may be positioned between the transmission mechanism 4 and the universal joint 6, the driven parts being connected to said joint, as presently to be explained.

Keyed to the drive shaft 8, operated by the transmission mechanism 4, is a cam sleeve 10, which is preferably provided with an enlarged portion 12 having any preferred number of angular cam faces or surfaces 14, (Fig. 3), the number of which may in practice be varied. Said cam sleeve 10 is adapted to be rotated with the drive shaft 8, and hence is preferably keyed thereto, as indicated at 16.

The cam sleeve 10 has also a reduced portion 18, provided with a pair of straight bottom grooves or cut-away portions 20, and a pair of top grooves or cut-away portions 22 are provided in the roller cage or roller operating member 28, presently to be more particularly described, in both of which grooves the control devices 24 are adapted to be moved, said top grooves or cut-away portions 22 having a spiral or angular portion 26, so that when said devices 24 are shifted backward or forward, in the manner presently to be explained, said devices will oscillate said cage or roller operating member 28, (Fig. 2) for the purpose also presently to be explained.

Surrounding the enlarged portion 12 of the cam sleeve 10 is a preferably ring shaped overrunning driven member 30 (Figs. 2, 3, and 7) to which is secured a suitable means for making brake application, in the shape of a brake drum 32 (Figs. 1 and 2) as by means of the bolts 34, on one end, which drum surrounds the reduced portion 18, and its adjuncts, of the cam sleeve 10, and said ring 30 has its other end closed by preferably the end 36 of the universal joint 6, secured thereto by any suitable means, such as the screw bolts 38, said universal joint rotating with said ring 30.

The two sets of driving and driven parts of the clutch mechanism, then, must be connected in some way. This may be done in numerous ways, one of which is more particularly shown in Fig. 2, in which the ring or overrunning member 30 is cut-away, or bored, and the enlarged portion 12 of the cam member 10 correspondingly cut away or bored to receive a bearing, which bearing may be of any preferred construction such as a pair of suitable bearing rings 40, between which the antifriction devices 42 are positioned, said bearing rings 40 being adapted to be held in position by any preferred means such as the concentric externally and internally threaded rings or nuts 44. This structure provides for convenient assembly and disassembly. And in addition to the key 16, the cam member 10 may be hollowed out as at 46 so that the inner reduced and screw threaded end 48 of the drive shaft 8 may receive the nut lock assembly 50 of suitable construction. This construction affords a simple, convenient and effective way of holding the drive shaft 8 in secured and detachable relation with the cam member 10.

To this end I provide a set of movable cam devices or elements, which devices may take a variety of forms, such as rollers, balls, or the like, it being essential, however, that at least certain of said devices shall be simultaneously controlled and operated, either manually or otherwise.

In the form of my invention in Figs. 2, 3, and 7, I have shown a set of rollers 52, adapted to be freely rotated upon any convenient and suitable support, such as the pins 54, each pin having a reduced and screw threaded portion 56 (Fig. 2) screwed into the roller cage operating element or means 28.

The cam devices 52 in the form of my invention shown in Figs. 2, 3 and 7 are adapted to have a limited oscillating or circumferential movement within the space 58 (Figs. 3 and 7) between the inner periphery of the ring 30 and the outer periphery of the cam member 10. When said devices are positioned as seen in Fig. 7 they are in neutral position and out of engagement with the angular cam surfaces 14 of the member 10. When they are in the position depicted in Fig. 3 the ring 30 is in locked engagement with the cam member 10; that is, there is a single lock in one direction, viz., forward drive, but there can be free wheeling or running in forward direction of the vehicle, the rollers 52 rotating on the pins 54 to this end.

The reduced portion 18 of the cam member 10, as seen more particularly in Figs. 2 and 6, is provided with depressions 60 to be selectively engaged by the balls or rollers 62, positioned in the cages 64, which balls or rollers are resiliently mounted by means of suitable springs 66.

The devices 24 may be operated by any suitable means, such as the arcuate, channeled members 68 embracing and holding a ring 68a in which are fitted the screw-threaded caps 70 (Fig. 2) provided with a kerf 72 to be engaged by a suitable implement for adjusting the same, which caps are included in the devices 24, said members 68 being secured to an operating yoke 74 (Fig. 4) in turn adapted to be manipulated by the rod and lever construction 76 (Fig. 1) by any suitable means. By actuating the yoke 74 the devices 24 may be positioned as shown in full lines in Fig. 6 or as in the dotted lines, the intermediate position being the neutral position.

Since Figure 4 is a cross-sectional view, taken on the line 4—4, Figure 2, it will be seen that the devices 24 include suitable cages 64 in each of which is positioned a spring 66 opposing the movement of the balls 62, which springs also abut the inner end of said cage. Surrounding and bearing each cage is a threaded cap 70 provided with a kerf 72 by which said cap may be screwed onto a ring 68a engaged and operated by the members 68, the devices 24 with their caps 70 thus acting to oscillate said member 28 as the devices 24 are moved axially. The ring 68a is shown as a composite structure including an inner portion 68b which fits into a rebated seat therefor in the main ring 68a. This inner portion 68b may be in sections for assemblage into the main ring 68a. The arcuate channeled members 68 have their arcuate channels engaged with the ring 68a in which are fitted the outer threaded portions of the caps 70, the members 68 being sprung upon the ring 68a by means of the yoke 74. Thus when the yoke 74 is shifted, the roller cage or roller operating member 28 is oscillated by the devices 24 with their caps or pins 70 operating in the oblique slots 22 and the balls or rollers 62 are shifted with respect to the cavity 60 being guided by the grooves 20 and this in turn causes the rollers 52 to be positioned either on the flat faces 14 of the cam 10 or adjacent the apices of the cam as previously explained.

Fig. 8 shows a modification in which the ring 30 is identical with the other form of my invention just described, but the cam member 10' has been modified to reduce the number of cam faces 14', and each face having coacting therewith and with the inner periphery of the ring 30 a pair of cam devices 52', one of which is unconnected to the operating means depicted in Figs. 2, 4 and 6, while the other is so connected. By said construction a double lock may be had by the engagement of the cam devices at or near the apices of the cam faces 14' of the cam member 10', and with the inner periphery of the ring 30. This provides an effective lock for a vehicle going down grade, the locking being had in both directions, that is forward rotation and reverse rotation.

Since one of the devices 52' for each cam face has no manual means of control, when said devices are free from the said cam faces, free wheeling is accomplished, and of necessity must be in only one direction of rotation, since the said free devices may engage the apex only to the left (Fig. 8) for general operation, which provides a lock in said direction. The other manually controlled devices 52' may be moved only to the right to engage the apex of the cam 10' for locking in that direction. Hence, there is a locking in two directions for conventional or general running, but free wheeling (when the free devices 52' are disengaged as shown in Fig. 8) in one direction only. In Figs. 3 and 7, of course, the devices 52 may be caused to engage either apex; hence, when said devices are free from the cam faces, a neutral, or wholly disconnected condition is had.

In Fig. 9 I have shown a slight modification including a ball cam device 52", rather than a roller, as previously explained. In said modification the cam member 10" is modified in that cavities are provided on its faces (omitted in the other form of my invention), the ball devices 52" being positioned in said cavities, and are adapted to be shifted therein from the flat faces of the cam member 10" to its apices, similarly to said other form of my invention. An operating member 70", functioning precisely as the member 28, by means of the devices 24", is perforated to receive and hold the cam devices or balls 52". In said modification, also, the balls 52" operate in a groove in the ring 30", absent in the other form of my invention.

Fig. 10 shows still another modification, the construction being simplified in that there are two sets of balls used of identical size for the sake of simplicity and ease in manipulation, the cam balls 53''' being of the same size as the bearing balls 42''', the set of bearing balls 42''' operating in a continuous circular groove formed in the outer portion of the member 10''', while the cam balls 53''' operate in spaced cam notches or paths of progressive depths formed in the member 10'''.

In Fig. 11 I have shown how the invention may be applied inside a transmission casing and to one of the pinions $p$ thereof, which is the equivalent of the overrunning ring 30, said pinion being hollowed out as shown for the reception of the cam devices 52, and their operating means, which are identical with those previously described.

In Fig. 12 I have shown how my invention may replace the conventional form of transmission mechanism, all gearing and gear shift means being dispensed with.

In this instance the drive shaft $2^{IV}$ with brake drum $32^{IV}$ is formed integral with the cam member $10^{IV}$, said cam member being provided with an enlarged portion $12^{IV}$ forming a guide within the overrunning member $30^{IV}$, which member has a flange $31^{IV}$ connected to the flange of the universal joint 6.

The cam member $10^{IV}$ is cut away as shown to accommodate the cam devices $52^{IV}$, which may be identical with those shown in Fig. 9, which devices are operable by the operating means 70", and the means 24, also identical with those shown in said figure.

The outer periphery of the overrunning member $30^{IV}$ may be provided with a surrounding ball bearing 40 having any preferred number of sets of balls 42, the entire assembly being surrounded by a transmission casing of suitable construction, any preferred packing means $33^{IV}$ being provided to retain the lubricating oil within said casing.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. In an apparatus of the class described, a cam sleeve provided with at least two sets of cut-out portions extending about the periphery thereof, an overrunning member surrounding said cam sleeve and provided with two sets of cut-out portions complementary to said cut-out portions in said cam sleeve, balls mounted in each of said cut-out portions, and angular and perforated means associated with one set of said balls for simultaneously moving the balls of said set.

2. In a transmission mechanism, a drive shaft, a cam member integral with said shaft, an overrunning member surrounding said cam member, an anti-friction bearing member surrounding said over-running member, movable cam devices between said over-running member and said cam member, a brake drum on said drive shaft, and longitudinally slidable sleeve and ball and socket means for actuating said cam devices.

3. In an apparatus of the class described, a driving member, a hollow driven member, a hollow cylindrical cam member having a plurality of reduced portions, means for mounting said driving member within one of said reduced portions, said cam member being positioned within said driven member, a cam device carrying member surrounding said driving member and said cam member and engaging each of said reduced portions, a set of cam devices associated with said cam device carrying member, and means associated with the reduced portions of both of said cam member and said cam device carrying member, whereby said driving and said driven members may optionally be operated in unison or run idly with respect to each other.

4. In an apparatus of the class described, a driving member, a driven member, a cam member associated with said driven member and secured to said drive member, said cam member having an extension provided with groove and plural socket means, a cage associated with said cam member and having an extension provided with a groove means complementary to said groove means on said cam member, spring opposed ball means extending through said groove means and adapted to engage successively said socket means, cam devices associated with said cage, and means for moving said spring opposed ball means in said grooves whereby said cam devices may be made to engage and disengage with said cam member, said ball and socket means being adapted to lock said cage after said cam devices have been moved.

5. In an apparatus of the class described, a driving member, a driven member, a cam member secured to said driving member, an antifriction bearing on said cam member and positioned internally of said driven member, a cage mounted for rotation on said cam member and on said driving member, a set of cam devices associated with said cage and adapted optionally to be engaged with or disengaged from said cam member and said driven member, a set of longitudinally movable locking devices extending through said cage and into said cam member for locking said cam devices in engaged or disengaged positions, including a cap detachably connected with each of said locking devices, and a yoke in continuous operative connection with the outer ends of each of said caps whereby said devices may be operated.

6. In an apparatus of the class described, a rotatable driving member, a rotatable driven member, means for making brake application to said rotatable driven member, a cam member in said driven member and secured to said driving member, an operating member juxtaposed to said cam member, part of which surrounds said cam member and part of which extends beyond said cam member, a set of cam devices projecting from said part which extends beyond said cam member, which devices are adapted to be engaged with and disengaged from said cam member and said driven member, a set of movable sleeve and ball and socket lock elements, slidable in grooves in said cam member and said operating member, whereby said movable lock elements may operate said operating member to cause said driving and driven members to be locked together for direct or reverse rotation or for idle rotation with respect to each other, and means for operating said lock elements.

7. In an apparatus of the class described, a roller cage for use in connection with a multiple acting overrunning clutch and a cam member, said cage comprising a combined angular and annular member, a set of rollers extending from said annular member, which rollers are selectively adapted to engage with or run idly with respect to said cam member, a slotted sleeve associated with said annular member, a set of control devices movable within the slotted portion of said sleeves, cap means for holding said control devices in position on said combined angular and annular member, and a yoke for operating said control devices for shifting said cage.

8. In an apparatus, such as defined in claim 7, characterized by a set of channeled arcuate members associated with the yoke and embracing the cap means of the control devices.

ARNOLD H. JESSEN.